J. H. BRINTON.
OPERATING FEED ROLLERS.
No. 22,931.                  Patented Feb. 15, 1859.
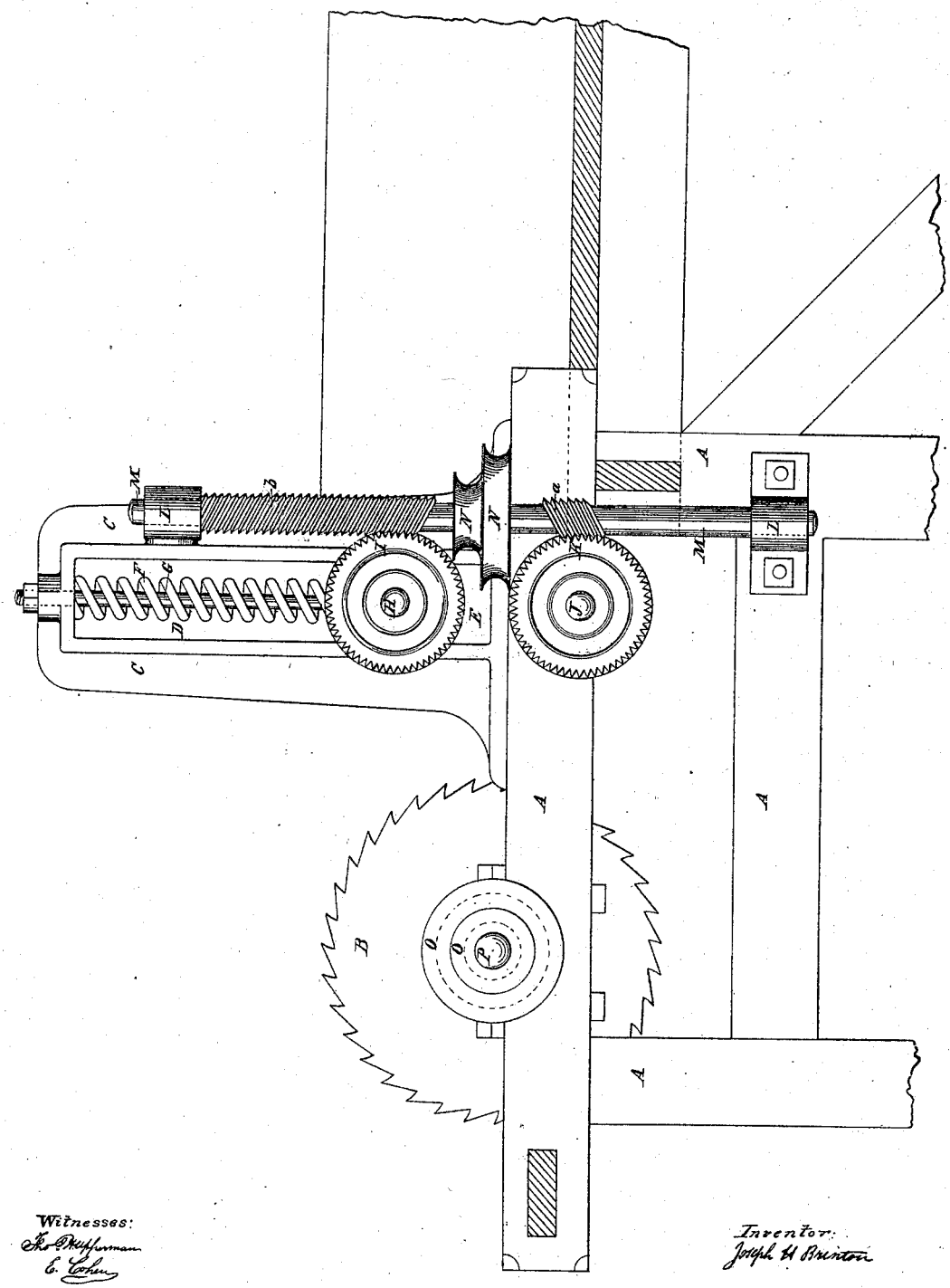
Witnesses:
Inventor:
Joseph H. Brinton

UNITED STATES PATENT OFFICE.

JOSEPH H. BRINTON, OF WEST CHESTER, PENNSYLVANIA.

METHOD OF OPERATING YIELDING FEED-ROLLERS.

Specification of Letters Patent No. 22,931, dated February 15, 1859.

*To all whom it may concern:*

Be it known that I, JOSEPH H. BRINTON, of West Chester, in the county of Chester and State of Pennsylvania, have invented certain new and useful Improvements in an Elastic Feed-Motion to be used in Connection with a Reducing-Cylinder; and I do hereby declare the following to be a full, clear, and exact description of the construction and operation of the same, reference being had to the accompanying drawings, making a part of this specification, and which represents a side elevation of a machine having my invention applied to it.

I am aware that one of a pair of feed rollers has been made elastic or yielding, while at the same time, it is kept in gear with the part that gives it its rotary motion. This I do not claim. But I am not aware that any elastic or yielding feed roller, has ever heretofore been geared and driven in the simple and efficient manner in which I do it.

My invention consists in a pair of feed rollers, both driven by the same screw shaft, while one of the pair is free while in motion, to yield to any increased pressure against it, by the material passing in contact with it, and through between the pairs of rolls.

To enable others skilled in the art to make and use my invention, I will proceed to describe the same with reference to the drawings.

My machine may be used for rasping woods such as dye woods—cutting or planing lumber, or for reducing stalks, roots, and other fibrous or textile materials.

A, is a stout substantial frame, upon which is mounted a cylinder B, furnished with suitable cutting or reducing instruments—such as saws set oblique to, or in a direct line with, the plane of its shaft. Or it may be furnished with straight or spiral cutting blades, in a manner well known to mechanicians. This cylinder of reducing instruments may be driven with a rapid motion by a belt leading from any first mover, passing over a pulley on the end of its shaft, or by rigid gearing driven by a crank or otherwise.

C, is a pillar block (there being two, but one only seen in the side view) properly secured to the main frame, in a slot D, in which a journal box E, can rise against the action of a helical spring F, coiled around an adjusting and guiding rod G. In these pairs of journal boxes E, are hung the journals H, of an elastic feed roll; and on one of the journals of said feed roll is a spur gear I, through which the roll receives its motion. Underneath the yielding roll, there is another feed roll, which turns in fixed boxes, and which has upon one of its journals J, a gear or pinion K through which said under roll receives its motion. But the relative position of these rolls may be changed, and the yielding one placed underneath if found desirable to do so.

In suitable supports L, L, is hung a screw shaft M, having cut upon it a right and left screw thread $a$, $b$, of which the one $a$ turns the pinion K, and the roll to which it is connected, and the other $b$ turns the pinion I, and the roll to which it is attached, both rolls turning toward each other and so as to catch and feed through between them the material that is to be subjected to the reducing cylinder. The screw thread $b$, is much longer than the other $a$ so that the roll which it drives, may rise and fall to accommodate itself to the material fed through between it and the lower roll, and still remain in gear with the screw thread $b$. The springs F, hold the roll down, to prevent it from rising too easily. Around the screw shaft M, or on it, are pulleys N, for receiving a belt from the pulleys O, on the shaft P, of the reducing cylinder, to give it motion, and the series of pulleys admit of increasing or diminishing its motion by shifting the belt on them in the usual way.

The roll to which the pinion or spur wheel I, it attached cannot rise, unless said spur wheel and roller are in motion; when not in motion around their axes, they cannot be raised, but by turning them the wheel I freely rolls along the screw thread, still keeping in gear with it, and continuing its rotating feed motion.

Having thus fully described the nature and object of my invention what I claim therein as new and desire to secure by Letters Patent is—

A pair of feed rolls, one of which is yielding, and both driven by the same screw shaft, and in gear with it at all times, substantially in the manner herein described.

JOSEPH H. BRINTON.

Witnesses:
THO. H. UPPERMAN,
E. COHEN.